US010360264B2

(12) United States Patent
Movsisyan et al.

(10) Patent No.: US 10,360,264 B2
(45) Date of Patent: *Jul. 23, 2019

(54) ACCESS CONTROL FOR USER ACCOUNTS USING A BIDIRECTIONAL SEARCH APPROACH

(71) Applicant: VMware, Inc., Palo Alto, CA (US)

(72) Inventors: Vardan Movsisyan, Yerevan (AM); Harutyun Beybutyan, Yerevan (AM)

(73) Assignee: WMWARE, INC., Palo Alto, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/093,750

(22) Filed: Apr. 8, 2016

(65) Prior Publication Data

US 2017/0295186 A1    Oct. 12, 2017

(51) Int. Cl.
*G06F 16/901* (2019.01)
*H04L 29/06* (2006.01)
*G06F 16/2453* (2019.01)

(52) U.S. Cl.
CPC .... *G06F 16/9027* (2019.01); *G06F 16/24532* (2019.01); *H04L 63/102* (2013.01)

(58) Field of Classification Search
CPC ................ H04L 63/105; H04L 63/102; G06F 17/30445; G06F 17/30961
USPC .......................................................... 726/4
See application file for complete search history.

(56) References Cited

U.S. PATENT DOCUMENTS

| | | |
|---|---|---|
| 2004/0187075 A1 | 9/2004 | Maxham et al. |
| 2006/0089932 A1* | 4/2006 | Buehler .............. G06F 21/6218 |
| 2007/0214497 A1 | 9/2007 | Montgomery et al. |
| 2012/0316962 A1* | 12/2012 | Rathod ................ G06Q 10/107 705/14.54 |
| 2013/0226680 A1 | 8/2013 | Gabriel |
| 2014/0173097 A1 | 6/2014 | Newton et al. |
| 2015/0163097 A1 | 6/2015 | Lipstone et al. |
| 2015/0180872 A1* | 6/2015 | Christner ................ H04L 63/10 726/4 |
| 2015/0207695 A1 | 7/2015 | Varney et al. |
| 2017/0004005 A1 | 1/2017 | Elliott et al. |

(Continued)

OTHER PUBLICATIONS

Richard E. Korf (Depth-first iterative-deepening: An optimal admissible tree search, Published 1985, p. 103, lines 2-3.*

(Continued)

*Primary Examiner* — Daniel B Potratz
*Assistant Examiner* — Vu V Tran
(74) *Attorney, Agent, or Firm* — Su IP Consulting

(57) ABSTRACT

An example method is provided for a computing device to perform access control for a user account. The method may include receiving a request for the user account to access a resource, wherein the resource is accessible via the computing device, and determining a permission set required to access the resource. The method may further include performing a bidirectional search to determine whether the user account is assigned to the permission set, the bidirectional search including a first search and a second search. In response to determination that the user account is included in a nested group membership that assigns the user account to the permission set based on the bidirectional search, the method may include permitting the user account to access the resource using the permission set.

18 Claims, 10 Drawing Sheets

(56) References Cited

U.S. PATENT DOCUMENTS

2017/0075919 A1* 3/2017 Bose .................. G06F 21/00
2017/0295183 A1 10/2017 Movsisyan et al.

OTHER PUBLICATIONS

Korf (Depth-first iterative-deepening: An optimal admissible tree search, Published 1985) (Year: 1985).*

* cited by examiner

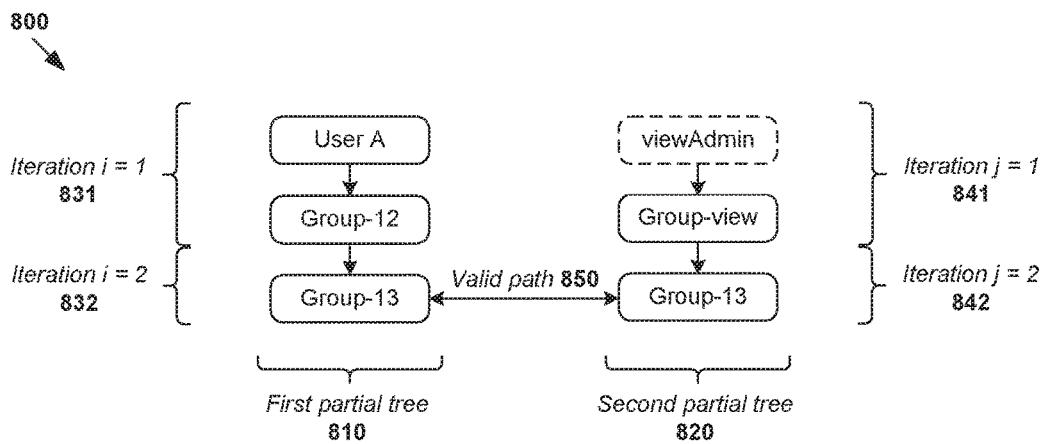
Fig. 8A
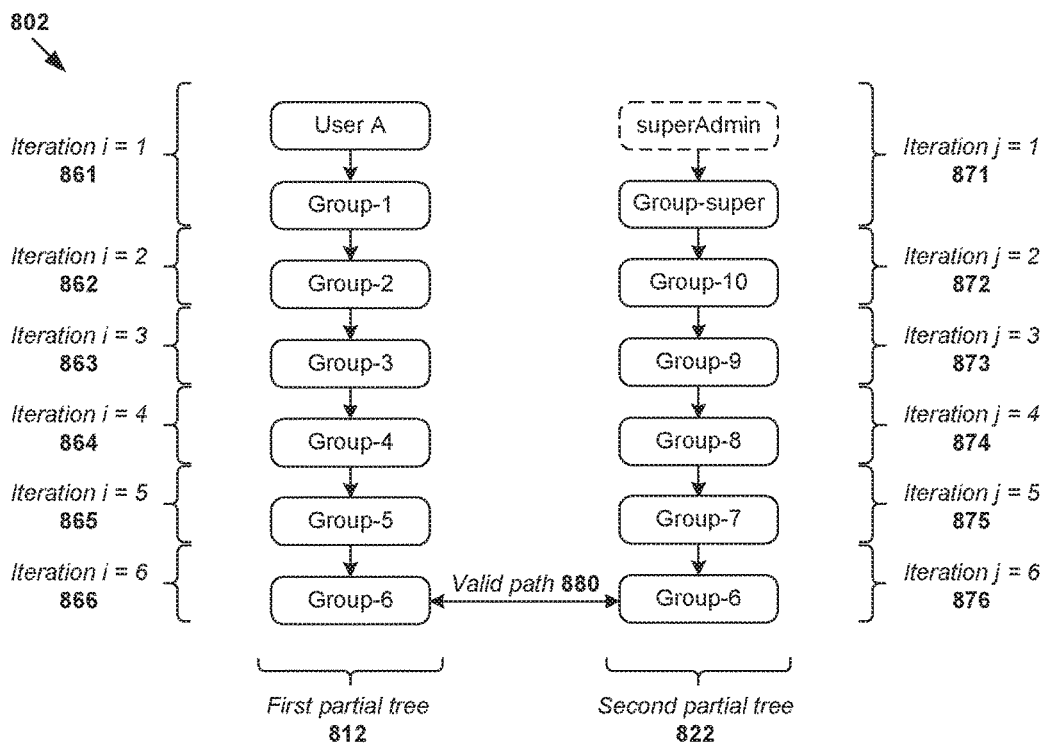
Fig. 8B
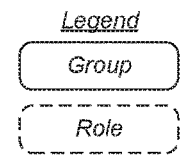

ACCESS CONTROL FOR USER ACCOUNTS USING A BIDIRECTIONAL SEARCH APPROACH

CROSS-REFERENCE TO RELATED APPLICATION

The present application is related in subject matter to U.S. patent application Ser. No. 15/093,747, which is incorporated herein by reference.

BACKGROUND

Unless otherwise indicated herein, the approaches described in this section are not admitted to be prior art by inclusion in this section.

Identity management refers broadly to the administration of individual identities (e.g., users) within a system. Identity management ensures that only authenticated users are able to log onto to an application, and only authorized users are able to access resources according to various policies. In particular, prior to allowing an authenticated user to access a particular resource, access control is performed to determine whether the user is authorized to access the resource. However, in practice, access control may take a long time to complete, which adversely affects the user's experience.

BRIEF DESCRIPTION OF DRAWINGS

FIG. 8A is a schematic diagram illustrating iterations of the example process in FIG. 7 when determining whether a user account is included in a first nested group membership that provides a first permission set;

FIG. 8B is a schematic diagram illustrating iterations of the example process in FIG. 7 when determining whether a user account is included in a second nested group membership that provides a second permission set;

DETAILED DESCRIPTION

Figure 1:
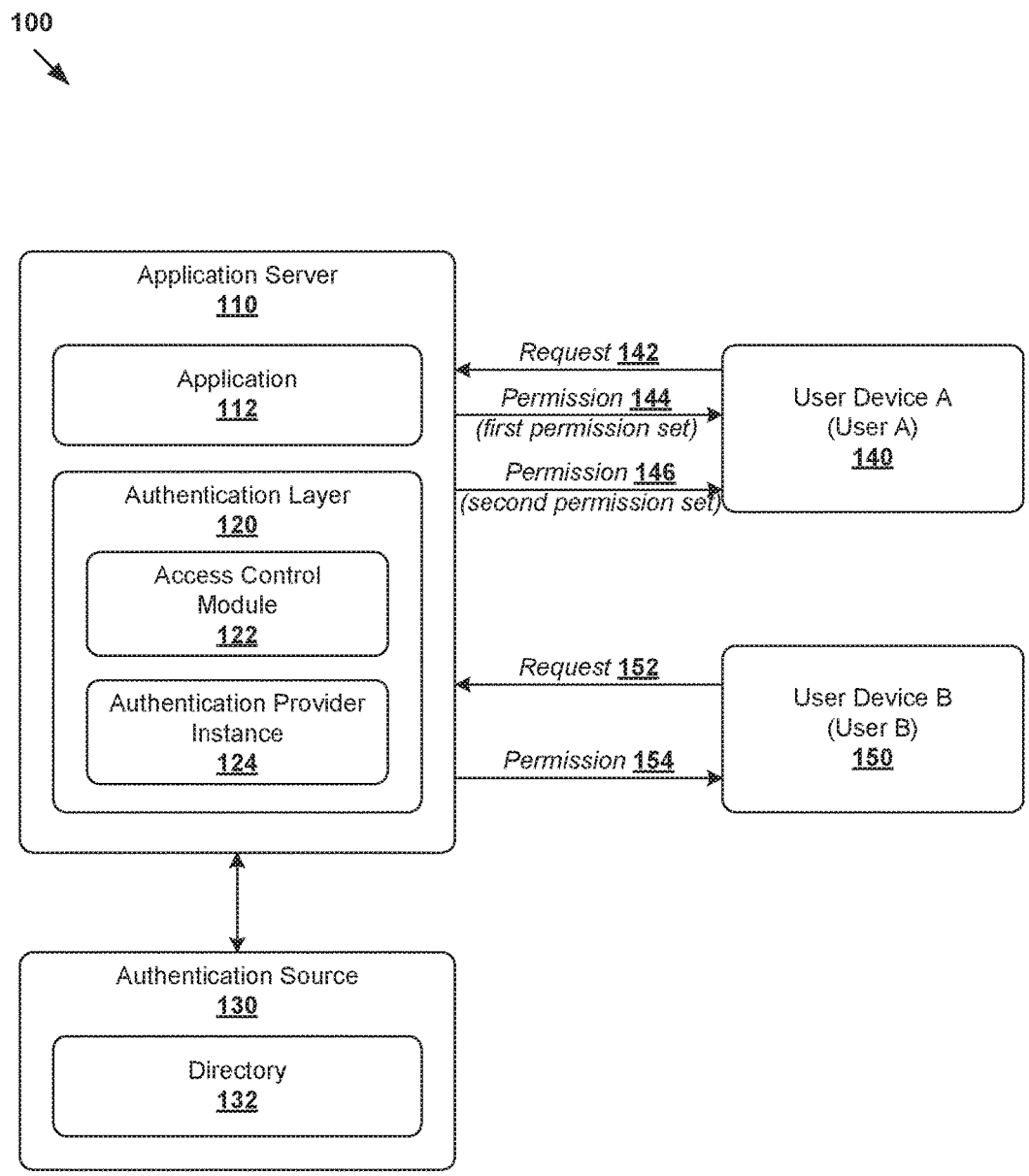
FIG. 1 is a schematic diagram illustrating an example network environment to provide access control for user accounts.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of implementing identity management will now be described in more detail. In more detail, FIG. 1 is a schematic diagram illustrating example network environment 100 to provide access control for user accounts. It should be understood that network environment 100 may include additional and/or alternative components than that shown, depending on the desired implementation.

In example computing environment 100 in FIG. 1, an example computing device in the form of application server 110 implements or provides access to one or more applications 112 (one shown for simplicity). For example, application 112 may be a web-based, log data analysis application accessible by user accounts represented as "User A" 140 and "User B" 150. For example, users operating respective user devices and using respective user accounts to log in and access resources via application server 110 over a communications network. In practice, application server 110 may be implemented using one or more physical and/or virtual entities. In multitier client-server architecture, application server 110 may interact with one or more web servers, database servers, file servers, certificate servers, etc. Each user device may be any suitable computing device acting as a client, such as desktop computer, laptop, mobile phone, etc.

Authentication layer 120 includes access control module 122 and authentication provider instance 124 to implement identity management functions, including authentication, access control, etc. The purpose of authentication is to verify a user's identity, such as by checking user account information (e.g., a user name and a password associated with the user user) during a login process. Other ways for authentication may be through smart cards, voice recognition, fingerprints, etc. The purpose of access control or authorization is to determine whether a user, once identified and successfully logged in, is permitted to access a resource of application 112 for security purposes. This protects resources from access by unauthorized users, thereby reducing or preventing activities that could lead to breach of security.

As used herein, the term "resource" of application 112 may refer generally to any suitable element, such as a user interface (e.g., web page, graphical user interface); a user interface element (e.g., edit button) on the user interface; data relating to application 112; a combination thereof, etc. Access control may be administered at a resource level by assigning resources with different permission sets. The term "permission set" may refer generally to a collection of permission representing an access level required. For example, the permission set may include one or more of the following: read-only permission, write permission, delete permission, copy permission, full control permission (e.g., a superset that includes all available permissions), etc. As used herein, the term "user account" (also known as "identity") may refer generally to any suitable system object to which a permission set may be assigned for resource access, and may represent a user, computer, process, etc. Throughout the present disclosure, "User A" 140 and "User B" 150 will be used as example user accounts managed by authentication layer 120.

Access control module 122 of authentication layer 120 is configured to receive request 142/152 for user account 140/150 to access a resource of application 112, and decide whether to permit or deny request 142/152. Authentication layer 120 also facilitates integration of identity management solutions for external authentication. Authentication provider instance 124 (e.g., implemented as logic with a specific authentication source configuration instance within authentication layer 120) may implement any suitable identity management solution, such as Active Directory (a trademark of Microsoft Corporation), VMware Identity Manager (vIDM) (a trademark of VMware, Inc.), etc.

Authentication provider instance 124 interacts with external authentication source 130 to query necessary information from directory 132, which is a data store storing information relating to user accounts, permissions, groups, security models, domains, etc. In the case of Active Directory, authentication source 130 may be a server functioning as an Active Directory domain controller. In this case, searches against directory 132 may be performed using Lightweight Directory Access Protocol (LDAP), etc. In practice, there may be multiple authentication provider instances 124, each interacting with one or more authentication sources.

To simplify administration in network environment 100, groups may be created to assign a common permission sets to multiple users at once, instead of performing the assignment to each user individually. A "group" may refer generally to a collection of members that can be managed as a single unit, such as managers, employees, etc. Using nesting, a group may be a member of another group. In this case, a "nested group" may refer generally to a group member that is itself a group having members.

Further, using role-based access control (RBAC), different permission sets may be assigned using different user roles. A "role" may refer generally to a collection of members that can be managed as a single unit. Examples of roles include normal administrator, super administrator, general user, etc. For example, the super administrator role may have the largest permission sets, followed by the normal administrator and general user roles. Members of a role may be users, groups and other roles. For example, among a group of managers, at least one may be assigned to the super administrator role while the rest assigned to the user role. If a user account's group is assigned to more than one role, the user will inherit the superset of permissions of all assigned roles.

For access control module 122 decide whether to permit or deny request 142/152 to access a resource of application 112, it is necessary to determine whether user account 140/150 is assigned with the necessary permission set. The determination may be based on groups of which user account 140/150 is a member (directly or indirectly through nested group membership) and a role directly or indirectly assigned to the groups of which user account 140/150 is a member.

Figure 2:
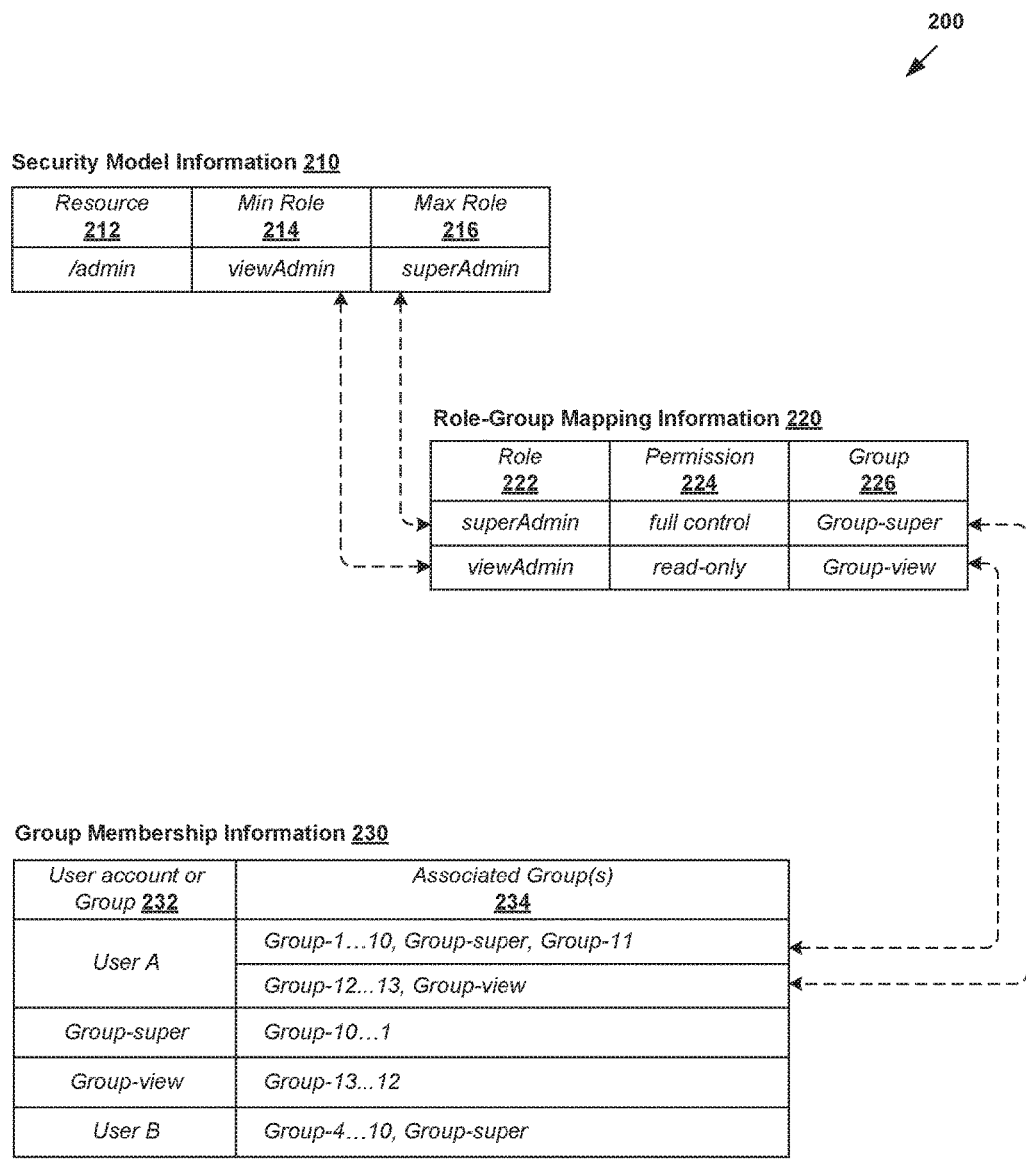
FIG. 2 is a schematic diagram illustrating example information processed by a computing device to perform access control for user accounts.

For example, FIG. 2 is a schematic diagram illustrating example information 200 processed by computing device 110 to perform access control for user accounts. In practice, access control module 122 may consider additional and/or alternative information than that shown in FIG. 2. In practice, information 200 may be stored in one or more suitable data structures in directory 132 and/or on application server 110, such as tables 210, 220 and 230. Information 200 may also be stored or configured as part of logic of access control module 122, such as by assuming that the administrator role has a larger permission set than that of a user role, etc.

In the example in FIG. 2, security model information 210 specifies one or more roles that are permitted to access each resource of application 112. In the example in FIG. 2, the resource is in the form of a webpage labelled "/admin" (e.g., representing "www.xyz.com/admin"; see 212). The resource is accessible by user accounts with permission sets associated with respective roles "viewAdmin" (see 214) and "superAdmin" (see 216). Role-group mapping information 220 specifies a permission set (see 224) granted to each role (see 222) and associated group or groups (see 226). For example, the "superAdmin" role is granted with full control permission and assigned to members of a group called "Group-super." On the other hand, the "viewAdmin" role only assigns a read-only permission to "Group-view."

Group membership information 230 specifies user or group (see 232) and associated groups (see 234). For example, in the case of "User A" 140, "Group-1 . . . 10" specifies that "User A" 140 is a member of "Group-1," which is a member of "Group-2," which is a member of "Group-3," which is a member of "Group-4," and so on. "Group-10" is a member of "Group-super," which is in turn a member of "Group-11." Further, "User A" is a member of "Group-12," which is a member of "Group-13," which is a member of "Group-view." In other words, "User A" 140 is a direct member of "Group-1" and "Group-12." Through nested group membership, "User A" 140 is also an indirect member of "Group-2" to "Group-11," "Group-super," "Group-13" to "Group-14," and "Group-view." In the case of "User B" 150, "Group-4 . . . 10" specifies that "User B" 150 is a member of "Group-4," which is a member of "Group-5," which is a member of "Group-6," and so on until "Group-10," which is in turn a member of "Group-super."

Conventionally, to allow or deny request 142/152 for user account 140/150 to access a particular resource (e.g., "/admin"), it is necessary to explore each and every group membership of which user account 140/150 is a direct member or indirect member. This search process may take a long time, especially where user account 140/150 has relatively complex nested group membership and application server 110 relies on identity management solutions for external authentication using authentication source 130. This creates a lot of processing burden on application server 110 and adversely affects the experience of user account 140/150 interacting with application 112.

According to examples of the present disclosure, the time required for access control module 122 to respond to request 142/152 may be reduced using one or more of the following example approaches:

(a) Parallel Search Approach

Instead of having to explore each and every group membership of user account 140/150 and determine a superset of all permissions available to user account 140/150 before responding to request 142/152, server 110 may perform parallel searches for different permission sets and respond to request 142/152 in multiple stages. For example, at a first stage (see 144 in FIG. 1), server 110 may first allow user account 140/150 to access a resource using a first permission set (e.g., read-only permission). At a later stage (see 146 in FIG. 1), server 110 may allow user account 140/150 to access the resource using the second permission set (e.g., full control permission). This reduces the waiting time for user account 140/150 to start using application 112 after logging in. Various examples of the parallel search approach will be described using FIG. 3, FIG. 4 and FIG. 5.

(b) Bidirectional Search Approach

To further reduce the time required to respond to request 142/152 from user account 140/150, a bidirectional search approach may be used to determine whether user account 140/150 is assigned with a particular permission set (e.g., full control permission). During the bidirectional search, an "initial state" may represent user account 140/150, and a "goal state" may represent the permission set. In particular, a first search is performed to, starting from the initial state, associate user account 140/150 with the permission set. A second search is also performed to, starting from the goal state, associate the permission set with user account 140/150. Various examples of the bidirectional search approach will be described will be described using FIG. 6, FIG. 7 and FIG. 8.

It should be understood that the above approaches may be used together, or independently of each other. Examples of the present disclosure may reduce the search time associated with processing nested group membership information, shorten the response time of server 110, provide better user experience, reduce the delay in resource access, etc. As will be described using FIG. 9, results from the above approaches for one user account (e.g., "User A" 140) may also be stored (e.g., cache) and reused to reduce the waiting time for another user account (e.g., "User B" 150).

Parallel Search Approach

Figure 3:
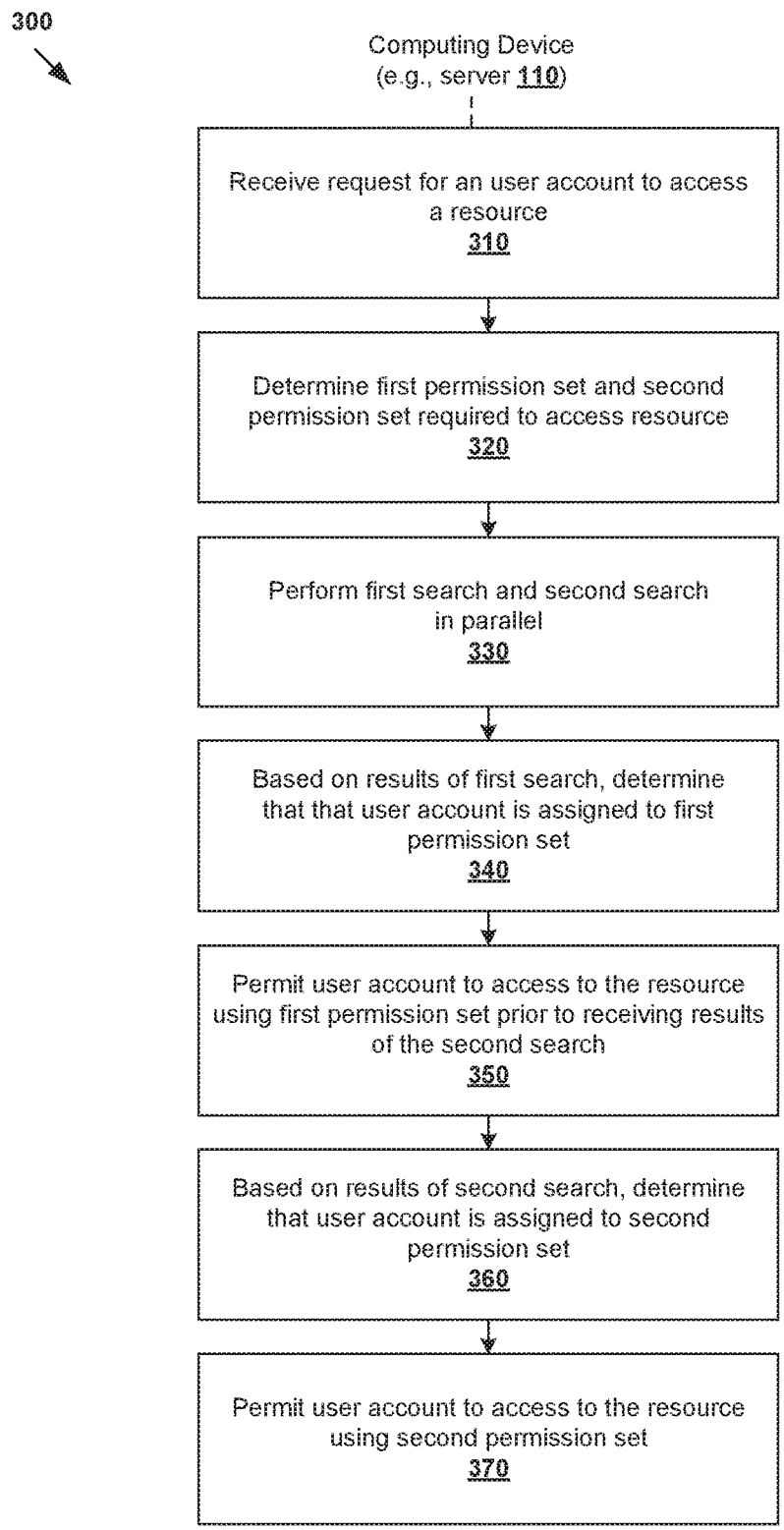
FIG. 3 is a flowchart of an example process for a computing device to perform access control for user accounts according to a first example approach.

FIG. 3 is a flowchart of example process 300 for computing device 110 to perform access control for user accounts according to a first example approach. Example process 300 may include one or more operations, functions, or actions illustrated by one or more blocks, such as 310 to 370. The various blocks may be combined into fewer blocks, divided into additional blocks, and/or eliminated depending on the desired implementation. In practice, example process 300 may be performed by server 110, such as using access control module 122 and authentication provider instance 124.

At 310 in FIG. 3, request 142 for "User A" 140 to access a resource is received by server 110. As discussed using FIG. 1 and FIG. 2, the resource may be a resource of application 112 that is accessible via server 110, such as a user interface (labelled "/admin") that displays data relating to application 112 or any other suitable element.

At 320 in FIG. 3, a first permission set and a second permission set required to access the resource are determined. As will be discussed further using FIG. 4, this may involve determining a first role (e.g., "viewAdmin") associated with the first permission set (e.g., read-only permission), and a second role (e.g., "superAdmin") associated with the second permission set (e.g., full control permission).

At 330 in FIG. 3, multiple searches are performed in parallel. For example, a first search to determine whether "User A" 140 is assigned to the first permission set through a first nested group membership. A second search is also performed to determine whether "User A" 140 is assigned to the second permission set through a second nested group membership.

At 340 and 350 in FIG. 3, prior to receiving results from the second search and in response to determination that "User A" 140 is assigned to the first permission set based on results of the first search, "User A" 140 is permitted to access the resource with the first permission set. For example, using group membership information 230 in FIG. 2, the first nested group membership may be membership of "Group-view." In this case, the first permission set is the read-only permission associated with the "viewAdmin" role.

At 360 and 370 in FIG. 3, in response to determination that "User A" 140 is assigned to the second permission set based on results of the second search, "User A" 140 is permitted to access the resource with the second permission set. For example, using group membership information 230 in FIG. 2, the second nested group membership may be membership of "Group-super." In this case, the second permission set is the full control permission (e.g., read and write) associated with the "superAdmin" role.

Using example process 300, server 110 may respond to request 142 from "User A" 140 once the first nested group membership is found, while asynchronously performing the second search. In the above example, "User A" 140 receives a first response (see 144 in FIG. 1) that permits access using the read-only permission without having to wait for the second search to complete. When the result of the second search is available, "User A" 140 receives a second response (see 146 in FIG. 1) that permits greater access using the full control permission. This way, different permission sets are made available to "User A" 140 in stages.

As will be explained using FIG. 4 and FIG. 5, example process 300 may be performed iteratively to explore nested group membership of "User A" 140. Using the example in FIG. 4 and FIG. 5, block 360 in FIG. 3 may include determining whether the second permission set (e.g., read and write permission) provides a greater access level compared to the first permission set (e.g., read only permission). If the determination is affirmative (e.g., logic assumes that a maximum role has greater access level than a minimum role), "User A" 140 is permitted to access the resource using the second permission set instead of the first permission set at block 370 in FIG. 3.

In practice, it should be understood that the second permission set (e.g., write permission) may provide at least one additional access level compared to the first permission set (e.g., read permission). In this case, in response to determination that the second permission set provides the additional access level, "User A" 140 may be permitted to access the resource using the second permission set in addition to the first permission set (e.g., cumulatively permitting both read and write) at block 370 in FIG. 3. However, if the second permission set does not provide greater access level or does not provide an additional access level compared to the first permission set, it is not necessary to initiate the second search at 330 in FIG. 1, and the user account may access the resource using the first permission set.

Figure 4:
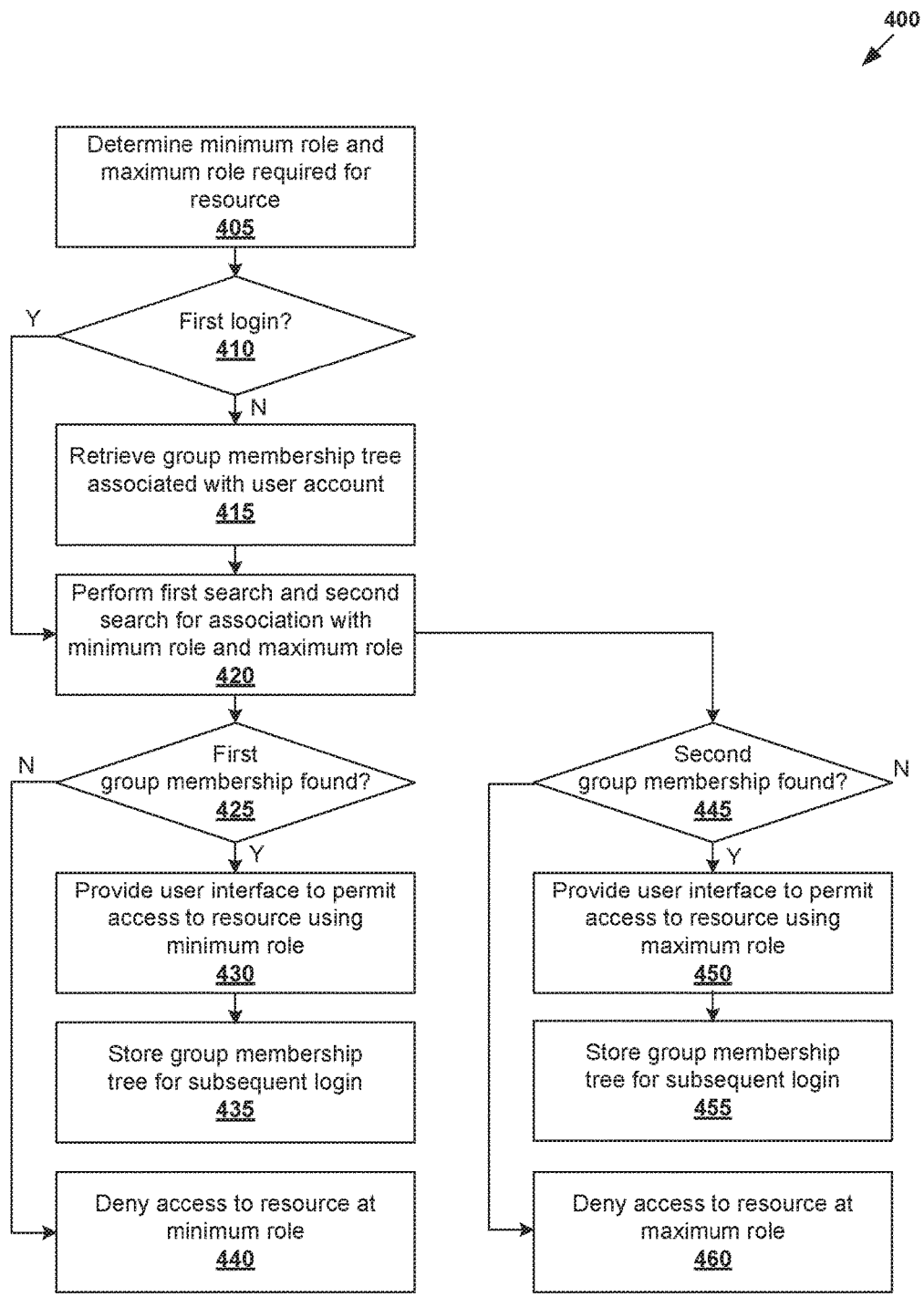
FIG. 4 is a flowchart of a detailed example process for a computing device to perform access control for user accounts according to a first example approach.

In more detail, FIG. 4 is a flowchart of detailed example process 400 for computing device 110 to perform access control for user accounts according to a first example approach. Example process 400 may include one or more operations, functions, or actions illustrated by one or more blocks, such as 405 to 460. The various blocks may be combined into fewer blocks, divided into additional blocks, and/or eliminated depending on the desired implementation.

At 405 in FIG. 4, multiple roles required to access the resource are determined, such as a minimum role and a maximum role. For example, based on security model information 210 in FIG. 2, minimum role="viewAdmin" provides a read-only permission (i.e., first permission set) to access the resource, and maximum role="superAdmin" provides a full control permission (i.e., second permission set).

At 410 and 415 in FIG. 4, in response to determining that "User A" 140 logs in for the first time, a group membership tree associated with "User A" 140 is retrieved. The group membership tree is a data structure storing different groups of which "User A" 140 is a member. The purpose of the retrieval at 415 is to reuse a pre-determined group membership tree to improve the speed of the subsequent searches. Assuming that it is the first login for "User A" 140, example process 400 proceeds to 415.

At 420 in FIG. 4, multiple searches are performed simultaneously or asynchronously. For example, a first search is performed to determine whether "User A" 140 has a first nested group membership (e.g., "Group-view") associated with minimum role="viewAdmin." A second search is performed to determine whether "User A" 140 has a first nested group membership (e.g., "Group-super") associated with maximum role="superAdmin."

Figure 5:
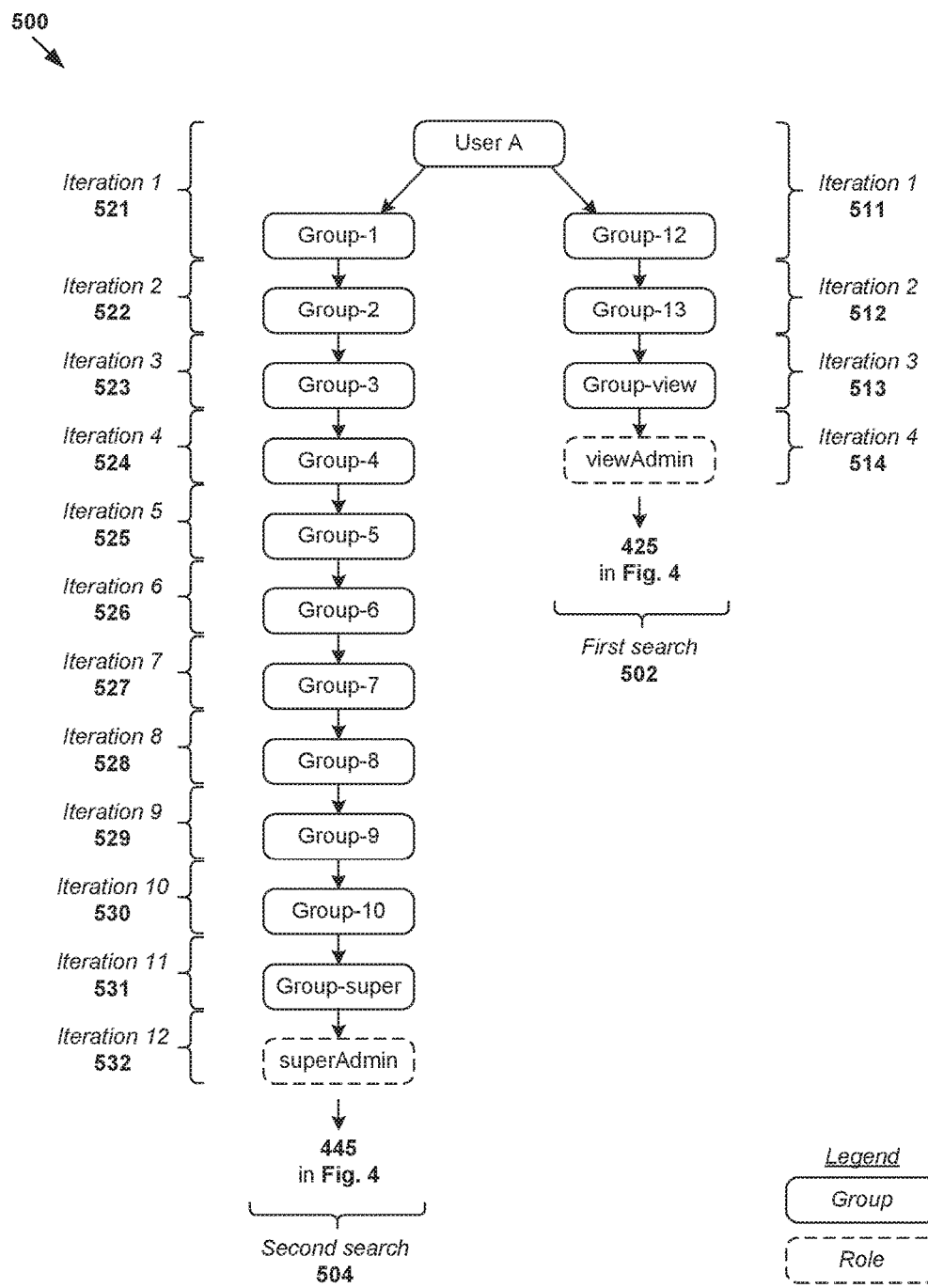
FIG. 5 is a schematic diagram illustrating an example group membership tree generated based on the information in FIG. 2.

To illustrate the searches, FIG. 5 is a schematic diagram illustrating example group membership tree 500 generated based on information 200 in FIG. 2. In this example, groups are represented using boxes in full line, while roles using boxes in dotted lines. The goal of first search 502 is to find a path from "User A" to minimum role="viewAdmin." The goal of second search 504 is to find a first path from "User A" to maximum role="superAdmin." First search 502 and second search 504 may be performed simultaneously and in parallel of each other.

At a first iteration, a root node representing "User A" 140 is created and mapped to multiple child nodes representing different first-level groups, such as "Group-1" (see 511) during of first search 502, and "Group-12" (see 521) during second search 504. Each first-level group is then mapped to further n-level groups (i.e., n>1) in parallel. As first search 502 continues, "Group-12" is mapped to "Group-13" (see 512), then to "Group-view" (see 513) and finally to the "viewAdmin" (see 514) role. As such, at 425 and 430 in FIG. 4, in response to determination that "User A" 140 is a member of "Group-view," "User A" 140 is permitted to access the resource using the read-only permission without waiting for the result of second search 504.

As second search 504 continues, "Group-1" is mapped to "Group-2" (see 522), "Group-3" (see 523), "Group-4" (see 524), "Group-5" (see 525), "Group-6" (see 526), "Group-7" (see 527), "Group-8" (see 528), "Group-9" (see 529), "Group-10" (see 530) and "Group-super" (see 531). At iteration 532 in FIG. 5, the path to maximum role="superAdmin" associated with "Group-super" is found. As such, at 445 and 450 in FIG. 4, in response to determination that "User A" 140 is a member of "Group-super," "User A" 140 is permitted to access the resource using the associated full control permission.

As such, once access using minimum role="viewAdmin" is permitted, "User A" 140 may be provided with a user interface that displays data relating to application 112. However, since read-only permission is granted at this stage, "User A" 140 is not permitted to perform any editing, such as by disabling associated user interface element (e.g., an edit button). Once access using maximum role="superAdmin" is permitted, the user interface element may be enabled to allow editing. This way, "User A" 140 can start using application 112 to view data without waiting for the full control permission. For example in FIG. 5, second search 504 (twelve iterations) takes longer compared to first search 502 (four iterations). By reducing the response time of server 110, the user experience of "User A" 140 may be improved.

At 435 and 455 in FIG. 4, group membership tree 500 is stored to process subsequent request(s) of "User A" 140. For example, the next time "User A" 140 logs in and requests access to the same resource or a different resource, it is not necessary to build group membership tree 500 from scratch, and group memberships associated with "viewAdmin" and "superAdmin," may be found more quickly. This further reduces the waiting time of "User A" 140 when interacting with application 112. Group membership tree 500 may be updated as group membership changes, such as "User A" 140 joining new groups or leaving existing groups.

At 440 in FIG. 4, if the first nested group membership is not found after all groups are explored, access using the minimum role is denied. Similarly, at 460 in FIG. 4, if the second nested group membership is not found after all groups are explored, access using the maximum role is also denied.

Although maximum and minimum roles are discussed in the above examples, it should be understood that additional roles may be specified for a particular resource. In this case, additional searches may be performed in parallel to search for a user account's association with respective roles.

Bidirectional Search Approach

According to examples of the present disclosure, a bidirectional search approach may be used to further reduce the search time to determine group membership that provides a particular permission set. A bidirectional search involves two simultaneous searches: a forward search from the "User A" 140 towards the goal of "superAdmin" and a backward search from the goal of "superAdmin" to "User A" 140. The search stops when the two searches meet in the middle.

Figure 6:
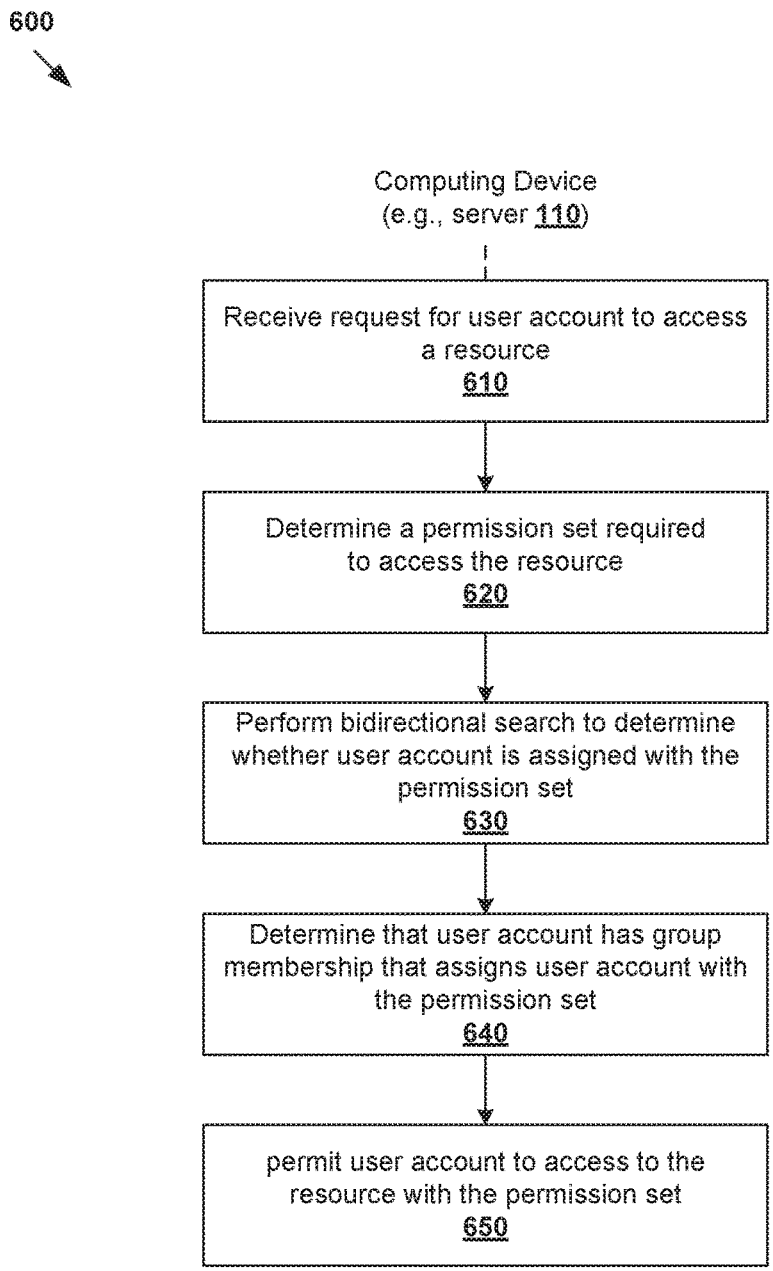
FIG. 6 is a flowchart of an example process for a computing device to perform access control for user accounts according to a second example approach.

In more detail, FIG. 6 is a flowchart of example process 600 for computing device 110 to perform access control for user accounts according to a second example approach. Example process 600 may include one or more operations, functions, or actions illustrated by one or more blocks, such as 610 to 650. The various blocks may be combined into fewer blocks, divided into additional blocks, and/or eliminated depending on the desired implementation. In practice, example process 600 may be performed by server 110, such as using access control module 122 and authentication provider instance 124. In the following, "User A" 140 will be used as an example user.

At 610 in FIG. 6, request 142 for "User A" 140 to access a resource is received by server 110. Using the example in FIG. 2 again, the resource may be a resource of application 112, such as a user interface (labelled "/admin") that displays data relating to application 112 or any other suitable element.

At 620 in FIG. 6, a permission set required to access the resource is determined. For example, the determination may involve checking security model information 210 and role-group mapping information 220 in FIG. 2. In this case, the permission set may be the read-only permission granted by the "viewAdmin" role, or the full control permission granted by the "superAdmin" role.

At 630 in FIG. 6, a bidirectional search is performed to determine whether "User A" 140 is assigned to a group membership that provides the permission set. For example, an initial state represents "User A" 140, and a goal state represents the permission set (e.g., obtained through associated role). In particular, the bidirectional search includes a forward search ("first search") to, starting from the initial state, associate "User A" 140 with the permission set. Further, the bidirectional search includes a backward search ("second search") in a reverse direction to, starting from the goal state, associate the permission set with "User A" 140. The forward and backward searches may be performed simultaneously.

At 640 and 650 in FIG. 6, in response to determination that "User A" 140 is included in a nested group membership that assigns "User A" 140 to the permission set based on the bidirectional search, "User A" 140 is permitted to access the resource using the permission set.

Figure 7:
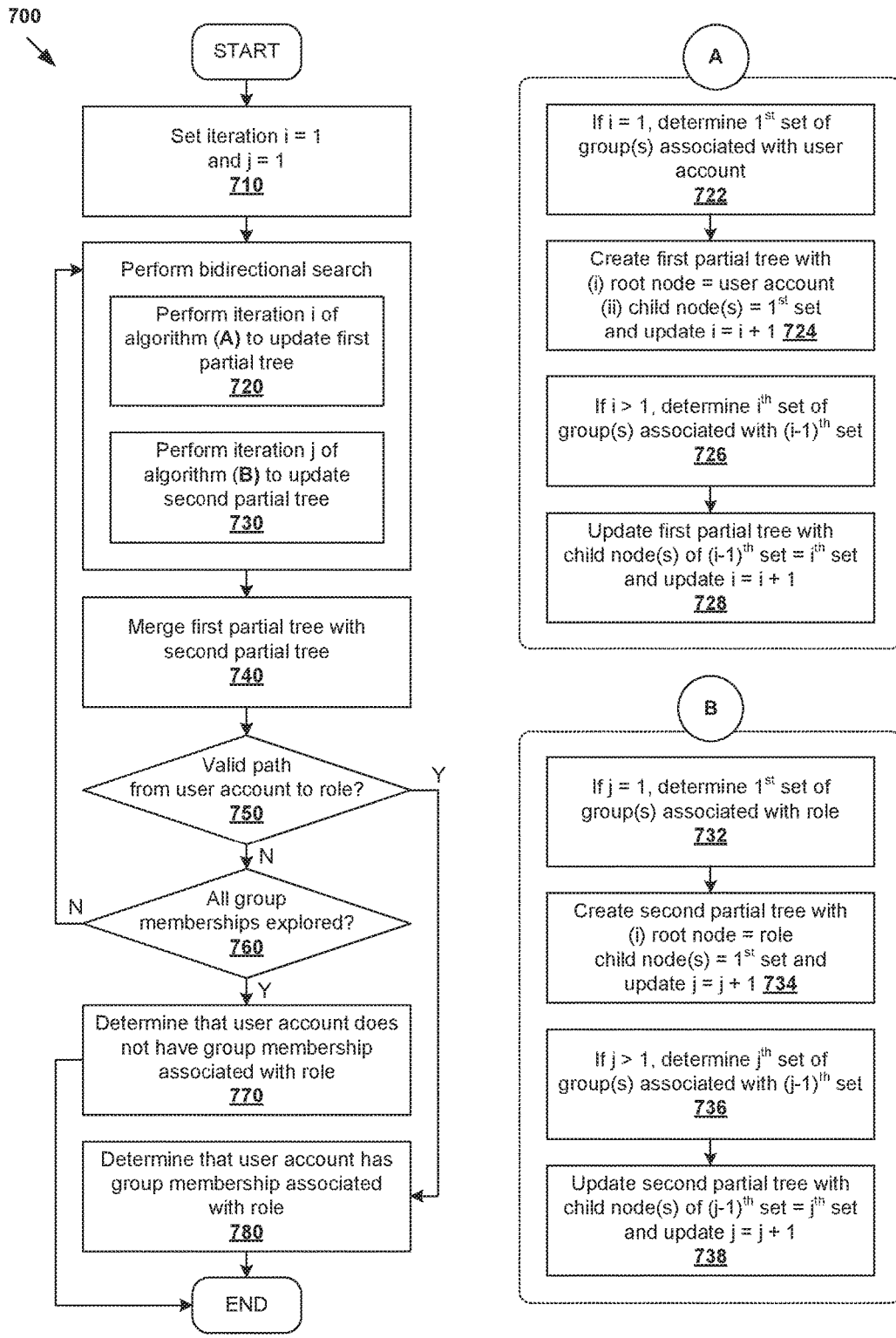
FIG. 7 is a flowchart of a detailed example process for a computing device to perform access control for user accounts according to a second example approach.

Example process 600 may be performed iteratively to determine whether "User A" 140 has group membership that provides the required permission to access a particular resource. In more detail, FIG. 7 is a flowchart of detailed example process 700 for computing device 110 to perform access control according to a second example approach. Example process 700 may include one or more operations, functions, or actions illustrated by one or more blocks, such as 710 to 780. The various blocks may be combined into fewer blocks, divided into additional blocks, and/or eliminated depending on the desired implementation.

At 710 in FIG. 7, to prepare for the bidirectional search, iteration numbers are set, such as i=1 for forward search using algorithm labelled "A" (see 720 to 728) and j=1 for the backward, permission-to-user search using algorithm labelled "B" (see 730 to 738). At 720, 730 and 740 in FIG. 7, forward and backward searches are simultaneously performed to generate a first partial tree and a second partial tree before merging them to determine whether there is a valid path connecting the partial trees. Blocks 720 to 750 in FIG. 7 will be explained further using FIG. 8A and FIG. 8B.

In a first example, FIG. 8A is a schematic diagram illustrating iterations 800 of example process 700 in FIG. 7 when determining whether a user account is included in a first nested group membership that provides a first permission set. In this case, the purpose of the bidirectional search is to determine whether "User A" 140 has nested group membership that provides the read-only permission available to the "viewAdmin" role. First partial tree 810 is created or updated incrementally according to algorithm "A" by performing blocks 722 and 724 in FIG. 7 for iteration i=1; and blocks 726 and 728 in FIG. 7 for iteration i>1. Simultaneously, second partial tree 820 is created or updated incrementally according to algorithm "B" by performing blocks 732 and 734 for iteration j=1; and blocks 736 and 738 for iteration j>1.

At initial iteration i=1 of the forward search (see 831 in FIG. 8), first partial tree 810 is created with a root node representing "User A" 140, and child node representing first-level "Group-12." At iteration j=1 of the backward search (see 841 in FIG. 8), second partial tree 820 is created with a different root node representing role="viewAdmin" and child node representing "Group-view." When partial trees 810 and 820 are merged at 750 in FIG. 7, no valid path (i.e., continuous path) connecting "User A" 140 and "viewAdmin" is found at this stage. After checking that there are more groups to be explored, example process 700 in FIG. 7 continues the bidirectional search as follows.

At subsequent iteration i=2 of the forward search (see 832 in FIG. 8), first partial tree 810 is updated with second-level "Group-13" as the child node of "Group-12." At the same time, iteration j=2 of the backward search (see 842 in FIG. 8) updates second partial tree 820 by adding "Group-13" as a child node of "Group-view." When partial trees 810 and 820 are merged, there is valid path 850 connecting "User A" 140 and "viewAdmin" via "Group-13." In this case, according to 780 in FIG. 7, it is determined that "User A" 140 has a nested group membership that provides the read-only permission associated with the "viewAdmin" role.

In a second example, FIG. 8B is a schematic diagram illustrating iterations 802 of example process 700 in FIG. 7 when determining whether a user account is included in a second nested group membership that provides a second permission set. In this case, the purpose of the bidirectional search is to determine whether "User A" 140 has nested group membership that provides the full control permission available to the "superAdmin" role. First partial tree 810 is created or updated iteratively according to algorithm "A" (see 722, 724, 726 and 728 in FIG. 7). Second partial tree 820 is created or updated simultaneously according to algorithm "B" (see 732, 734, 736 and 738 in FIG. 7).

At initial iteration i=1 of the forward search (see 861 in FIG. 8), first partial tree 812 is created with "User A" 140 as the root node, and first-level "Group-1" as the child node. At the same time, iteration j=1 of the backward search (see 871 in FIG. 8) creates second partial tree 822 with role="superAdmin" as the root node, and associated "Group-super" as the child node. When partial trees 812 and 822 are merged at 750 in FIG. 7, no valid path connecting "User A" 140 and "viewAdmin" is found at this stage. After checking that there are more groups to be explored, example process 700 in FIG. 7 continues the bidirectional search as follows.

At iteration i=2 (see 862 in FIG. 8), first partial tree 812 is updated by adding "Group-2" as a child node of "Group-1." At iteration j=2 (see 872 in FIG. 8), second partial tree 822 is updated by adding "Group-10" as a child node of "Group-super." When partial trees 812 and 822 are merged, no valid path from "User-A" 140 to "superAdmin" is found. This is also the case for the next few iterations (i.e., i, j=3, 4, 5) in FIG. 8, where first partial tree 812 is updated with "Group-3" (see 863), "Group-4" (see 864) and "Group-5" (see 865). At the same time, second partial tree 822 is updated by incrementally adding "Group-9" (see 873), "Group-8" (see 874) and "Group-7" (see 875). At each iteration, partial trees 812 and 822 are merged to check for any valid path from "User-A" 140 to "superAdmin."

At subsequent iteration i=7 (see 866 in FIG. 8), first partial tree 810 is updated with sixth-level "Group-6" (i.e., member of "Group-5) as the child node. At the same time, iteration j=2 (see 876 in FIG. 8) updates second partial tree 820 by adding "Group-6" as a child node of "Group-7." In this case, when partial trees 812 and 822 are merged, there is valid path 880 connecting "User A" 140 and "viewAdmin" via "Group-6" is found. In this case, at 780 in FIG. 7, it is determined that "User A" 140 has nested group membership that provides the full control permission. Otherwise, after exploring all groups at 770 in FIG. 7, it is determined that "User A" 140 does not have the relevant group membership.

Using the bidirectional search, fewer iterations are required to arrive at the result. In particular, two iterations (i.e., instead of four) are required to search for the association between "User A" 140 and "viewAdmin" in the example in FIG. 8A, and six iterations (i.e., instead of twelve) to search for the association between "User A" 140 and "superAdmin" in the example in FIG. 8B.

Although some examples are shown in FIG. 8A and FIG. 8B, it should be understood that example process 700/800 may be applied to more complex nested group membership information. Using first partial tree 812 in FIG. 8B as an example, "Group-1" may be linked with multiple child nodes (instead of "Group-2" only). In this case, the forward search from "User A" 140 may continue by simultaneously exploring each of the child nodes to find a valid path to the "superAdmin" role.

Reusing Group Membership Information

The above results may be reused the next time "User A" 140 logs in and requests access to the same or different resource. For example, first partial tree 810 may be merged with second partial tree 820 in FIG. 8A to form a branch connecting "User A" 140 to "viewAdmin" in group membership tree 500 in FIG. 5. Similarly, first partial tree 812 may be merged with second partial tree 822 in FIG. 8B to form another branch connecting "User A" 140 to "superAdmin" in group membership tree 500 in FIG. 5. This further reduces the waiting time and improves the experience of "User A" 140 when interacting with application 112. Group membership tree 500 may be updated as group membership changes, such as "User A" 140 joining new groups or leaving existing groups.

Group membership tree 500 created for "User A" 140 may also be shared with another user, such as "User B" 150 ("second user"). Referring to FIG. 2 again, "User B" 150 is a member of "Group-4," which is a member of "Group-5," which is a member of "Group-6," which is a member of "Group-7," which is a member of "Group-8," which is a member of "Group-9," which is a member of "Group-10," which is a member of "Group-super" associated with the "superAdmin" role. See group membership information 230 and role-group mapping information 220.

Figure 9:
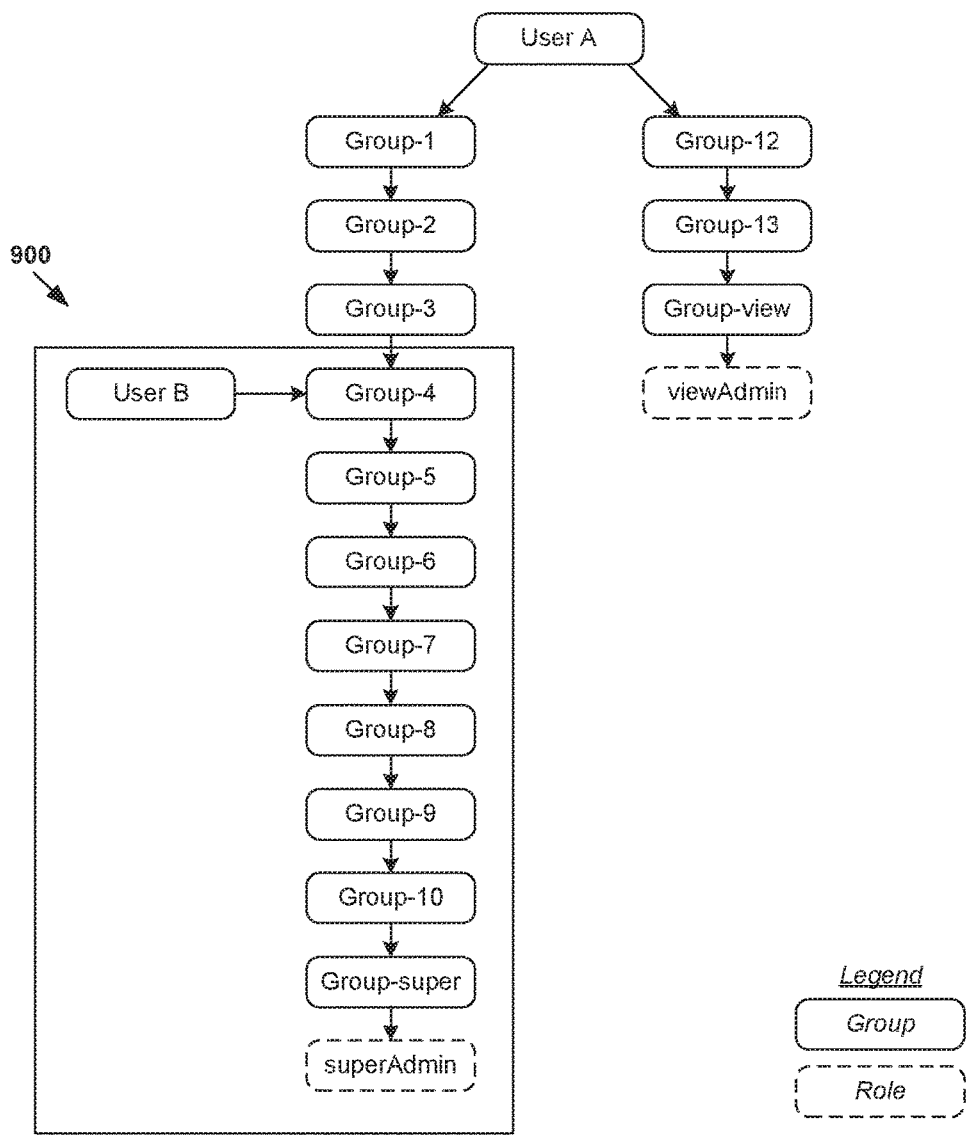
FIG. 9 is a schematic diagram illustrating example reuse of the group membership tree in FIG. 5.

FIG. 9 is a schematic diagram illustrating example reuse of group membership tree 500 in FIG. 5. For example, when server 110 receives request 152 from "User B" 150 to access a particular resource that requires the "superAdmin" role, group membership tree 500 may be searched. In particular, the known mapping between "Group-4" to "superAdmin" via "Group-5," "Group-6" up until "Group-super" may be utilized to speed up the search time, and therefore reduce the waiting time for "User B" 150. In the example in FIG. 1, in response to determination that "User B" 150 has the relevant group membership, server 110 may respond to request 152 by allowing "User B" 150 to access the resource with the full control permission associated with the "superAdmin" role. It should be noted that the resource requested by "User B" 150 may be the same resource as that requested by "User A" 140, or a different resource.

In practice, first partial tree 810/812 (i.e., user-to-groups tree) and second partial tree 820/822 (i.e., role-to-groups tree) of "User A" 140 may be stored as part of, or within, a giant, composite tree-map associated with multiple user accounts. The composite tree map, which is transitory in the sense of being modified dynamically, may be updated with new trees for each new user-related tree nodes. In this case, the decision to whether to permit or deny a request from "User B" 150 may be made based on tree-map information relating to "User B" 150. In the example in FIG. 9, since there is an overlap between the tree-map information relating to "User A" 140 and "User B" 150, access control may be performed for "User B" 150 by reusing the tree-map information relating to "User A" 140.

Computing Device

Figure 10:
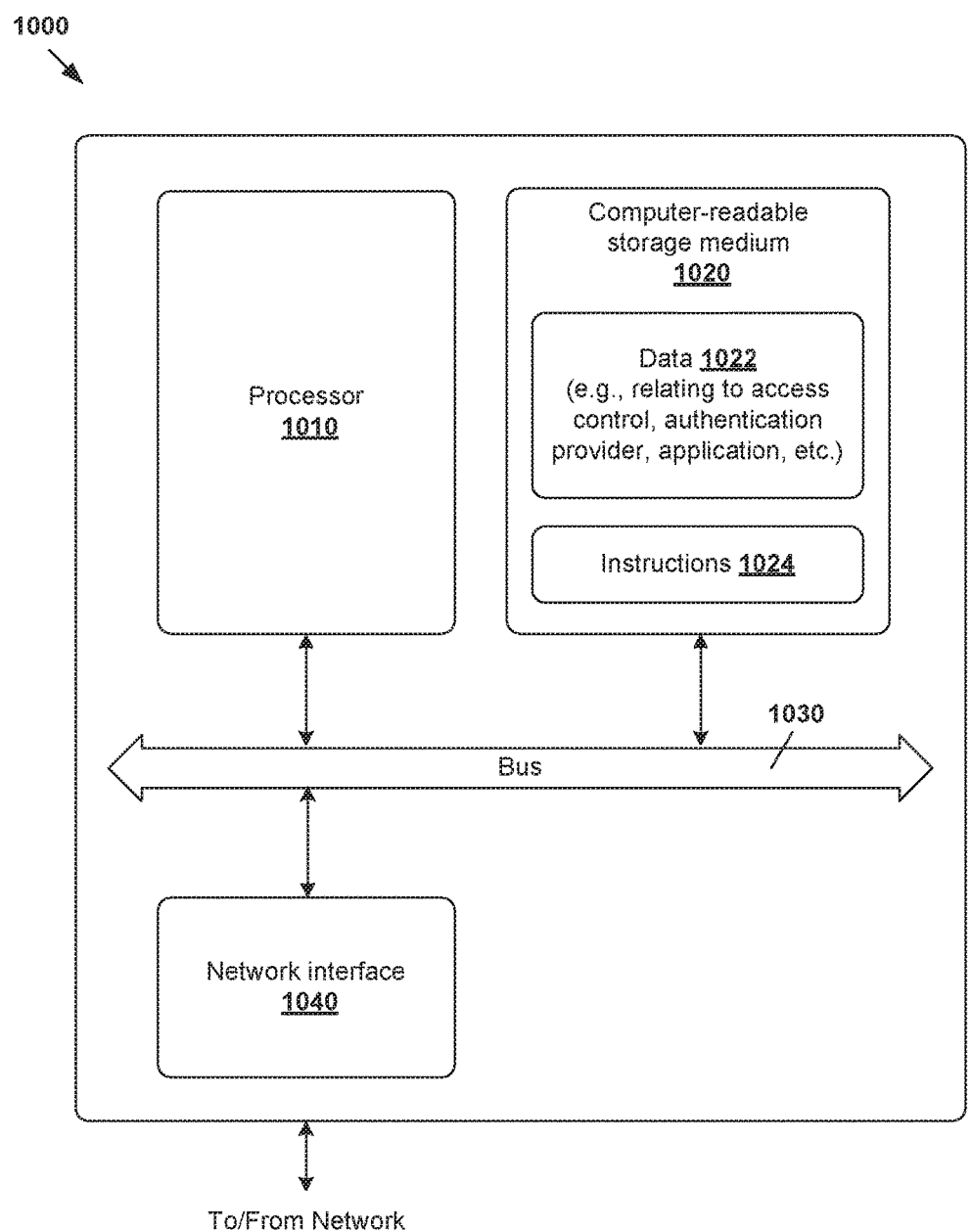
FIG. 10 is a schematic diagram illustrating an example computing device capable of acting as a server.

The above examples can be implemented by hardware (including hardware logic circuitry), software or firmware or a combination thereof. FIG. 10 is a schematic diagram illustrating example computing device 1000 capable of acting as application server 110. Example computing system 1000 may include processor 1010, computer-readable storage medium 1020, network interface 1040, and bus 1030 that facilitates communication among these illustrated components and other components.

Processor 1010 is to perform processes described herein with reference to the drawings. Computer-readable storage medium 1020 may store any suitable data 1022, such as data relating to applications, authentication providers, authentication sources, etc. Computer-readable storage medium 1020 may further store computer-readable instructions 1024 which, in response to execution by processor 1010, cause processor 1010 to perform processes described herein with reference to FIG. 1 to FIG. 9.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computing device to perform access control for a user account, the method comprising:
receiving a request for the user account to access a resource, wherein the resource is accessible via the computing device;
determining a permission set required to access the resource;

performing a bidirectional search to determine whether the user account is assigned to the permission set, comprising:
performing a first search of a data structure comprising nesting of user groups, starting from the user account and iteratively generating a first partial tree, to determine first user groups that the user account is a direct member or an indirect member through at least one other first user group;
simultaneously performing a second search of the data structure comprising nesting of user groups, starting from the permission set and iteratively generating a second partial tree, to determine second user groups that are directly assigned the permission set or indirectly assigned the permission set through at least one other second user group; and
merging, at each iteration of the first search and the second search, the first partial tree with the second partial tree to determine whether there is a path from a first root node representing the user account to a second root node representing a role associated with the permission set;
determining if the user account has a nested user group membership that assigns the user account to the permission set based on the bidirectional search; and
in response to determination that the user account has the nested user group membership that assigns the user account to the permission set based on the bidirectional search, permitting the user account to access the resource using the permission set.

2. The method of claim 1, wherein the first partial tree includes the first root node and multiple first child nodes representing the nested user group membership of the user account, and each first child node represents a user group of which the user account is a direct member or an indirect member through at least one other user group.

3. The method of claim 1, wherein the second partial tree includes the second root node and multiple second child nodes each representing a user group directly assigned with the role or indirectly assigned with the role through at least one other user group.

4. The method of claim 1, wherein the method further comprises:
receiving a further request for a second user account to access the resource or a second resource; and
determining whether to permit or deny access to the resource or the second resource based on the first partial tree and second partial tree.

5. The method of claim 1, wherein determining the permission set comprises:
determining a first permission set and a second permission set required to access the resource.

6. The method of claim 5, wherein the performing the bidirectional search comprises:
performing a first bidirectional search and a second bidirectional search in parallel, wherein the first bidirectional search is to determine whether the user account is assigned with the first permission set and the second bidirectional search is to determine whether the user account is assigned with the second permission set.

7. A non-transitory computer-readable storage medium that includes a set of instructions which, in response to execution by a processor of a computing device, cause the processor to perform a method to provide access control for a user account, the method comprising:
receiving a request for the user account to access a resource, wherein the resource is accessible via the computing device;
determining a permission set required to access the resource;
performing a bidirectional search to determine whether the user account is assigned to the permission set, comprising:
performing a first search of a data structure comprising nesting of user groups, starting from the user account and iteratively generating a first partial tree, to determine first user groups that the user account is a direct member or an indirect member through at least one other first user group;
simultaneously performing a second search of the data structure comprising nesting of user groups, starting from the permission set and iteratively generating a second partial tree, to determine second user groups that are directly assigned the permission set or indirectly assigned the permission set through at least one other second user group; and
merging, at each iteration of the first search and the second search, the first partial tree with the second partial tree to determine whether there is a path from a first root node representing the user account to a second root node representing a role associated with the permission set;
determining if the user account has a nested user group membership that assigns the user account to the permission set based on the bidirectional search; and
in response to determination that the user account has the nested user group membership that assigns the user account to the permission set based on the bidirectional search, permitting the user account to access the resource using the permission set.

8. The non-transitory computer-readable storage medium of claim 7, wherein the first partial tree includes the first root node and multiple first child nodes representing the nested user group membership of the user account, and each first child node represents a user group of which the user account is a direct member or indirect member through at least one other user group.

9. The non-transitory computer-readable storage medium of claim 7, wherein the second partial tree includes the second root node and multiple second child nodes each representing a user group directly assigned with the role or indirectly assigned with the role through at least one other user group.

10. The non-transitory computer-readable storage medium of claim 7, wherein the method further comprises:
receiving a further request for a second user account to access the resource or a second resource; and
determining whether to permit or deny the further request based on the first partial tree and second partial tree.

11. The non-transitory computer-readable storage medium of claim 7, wherein determining the permission set comprises:
determining a first permission set and a second permission set required to access the resource.

12. The non-transitory computer-readable storage medium of claim 11, wherein the performing the bidirectional search comprises:
performing a first bidirectional search and a second bidirectional search in parallel, wherein the first bidirectional search is to determine whether the user account is assigned with the first permission set and the second bidirectional search is to determine whether the user account is assigned with the second permission set.

13. A computing device configured to perform access control for a user account with nested user group membership, the computing device comprising:
a processor;
a non-transitory computer-readable medium having stored thereon instructions that, when executed by the processor, cause the processor to:
receive a request for the user account to access a resource, wherein the resource is accessible via the computing device;
determine a permission set required to access the resource;
perform a bidirectional search to determine whether the user account is assigned to the permission set, comprising:
performing a first search of a data structure comprising nesting of user groups, starting from the user account and iteratively generating a first partial tree, to determine first user groups that the user account is a direct member or an indirect member through at least one other first user group;
simultaneously performing a second search of the data structure comprising nesting of user groups, starting from the permission set and iteratively generating a second partial tree, to determine second user groups that are directly assigned the permission set or indirectly assigned the permission set through at least one other second user group; and
merging, at each iteration of the first search and the second search, the first partial tree with the second partial tree to determine whether there is a path from a first root node representing the user account to a second root node representing a role associated with the permission set;
determining if the user account has a nested user group membership that assigns the user account to the permission set based on the bidirectional search; and
in response to determination that the user account has the nested user group membership that assigns the user account to the permission set based on the bidirectional search, permitting the user account to access the resource using the permission set.

14. The computing device of claim 13, wherein the first partial tree includes the first root node and multiple first child nodes representing the nested user group membership of the user account, and each first child node represents a user group of which the user account is a direct member or indirect member through at least one other user group.

15. The computing device of claim 13, wherein the second partial tree includes the second root node and multiple second child nodes each representing a user group directly assigned with the role or indirectly assigned with the role through at least one other user group.

16. The computing device of claim 13, wherein the instructions further cause the processor to:
receive a further request for a second user account to access the resource or a second resource; and
determine whether to permit or deny the further request based on the first partial tree and second partial tree.

17. The computing device of claim 13, wherein instructions for determining the permission set cause the processor to:
determine a first permission set and a second permission set required to access the resource.

18. The computing device of claim 17, wherein instructions for performing the bidirectional search cause the processor to:
perform a first bidirectional search and a second bidirectional search in parallel, wherein the first bidirectional search is to determine whether the user account is assigned with the first permission set and the second bidirectional search is to determine whether the user account is assigned with the second permission set.

* * * * *